United States Patent
Kora et al.

(10) Patent No.: US 12,044,662 B2
(45) Date of Patent: Jul. 23, 2024

(54) LIQUID CARBON DIOXIDE SUPPLY DEVICE AND SUPERCRITICAL FLUID APPARATUS

(71) Applicant: SHIMADZU CORPORATION, Kyoto (JP)

(72) Inventors: Chihiro Kora, Kyoto (JP); Tsuyoshi Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 353 days.

(21) Appl. No.: 17/616,656

(22) PCT Filed: Jun. 11, 2019

(86) PCT No.: PCT/JP2019/023156
§ 371 (c)(1),
(2) Date: Dec. 5, 2021

(87) PCT Pub. No.: WO2020/250317
PCT Pub. Date: Dec. 17, 2020

(65) Prior Publication Data
US 2022/0229024 A1 Jul. 21, 2022

(51) Int. Cl.
*G01N 30/30* (2006.01)
*B01D 15/16* (2006.01)
*B01D 15/40* (2006.01)

(52) U.S. Cl.
CPC ........... *G01N 30/30* (2013.01); *B01D 15/161* (2013.01); *B01D 15/40* (2013.01); *G01N 2030/3092* (2013.01)

(58) Field of Classification Search
CPC ....... G01N 30/30; B01D 15/40; B01D 15/161
See application file for complete search history.

(56) References Cited

U.S. PATENT DOCUMENTS

| | | | |
|---|---|---|---|
| 2016/0274071 A1* | 9/2016 | Yamamoto | F04B 39/06 |
| 2018/0112896 A1* | 4/2018 | James | F25B 25/005 |
| 2020/0355407 A1 | 11/2020 | Ueda | |

FOREIGN PATENT DOCUMENTS

| | | |
|---|---|---|
| CN | 105986993 A | 10/2016 |
| EP | 3318829 A1 | 5/2018 |

(Continued)

OTHER PUBLICATIONS

"Coolant or Refrigerant" retrieved from https://www.acprocold.com/uk/help-and-advice/coolant-vs-refrigerant/ on Jan. 16, 2024 (Year : 2024).*

(Continued)

*Primary Examiner* — Nathaniel J Kolb
(74) *Attorney, Agent, or Firm* — Renner, Otto, Boisselle & Sklar, LLP

(57) ABSTRACT

A liquid carbon dioxide supply device is configured to supply liquid carbon dioxide to a supercritical fluid apparatus including a separation column, and includes a first flow path, a second flow path, a compressor, a heat exchanger and a pump. The compressor circulates a refrigerant through the first flow path such that a refrigerant cycle is repeated. The heat exchanger exchanges heat between the first flow path and the second flow path. The pump supplies liquid carbon dioxide flowing through the second flow path to the separation column of the supercritical fluid apparatus.

9 Claims, 2 Drawing Sheets

(56) References Cited

FOREIGN PATENT DOCUMENTS

| | | |
|---|---|---|
| JP | 2010-101875 A | 5/2010 |
| JP | 2012-220030 A | 11/2012 |
| JP | 2016-173343 A | 9/2016 |
| WO | 2019/049744 A1 | 3/2019 |

OTHER PUBLICATIONS

International Search Report for corresponding Application No. PCT/JP2019/023156, mailed Sep. 10, 2019.
Written Opinion for corresponding Application No. PCT/JP2019/023156, mailed Sep. 10, 2019 (English Machine translation).
Notice of Reasons for Refusal for corresponding Japanese Patent Application No. 2021-525453 dated Mar. 29, 2023 with English machine translation.
Notice of Reasons for Refusal for corresponding Japanese Patent Application No. 2021-525453 dated Dec. 6, 2022, with English machine translation.
Office Action in corresponding Chinese Patent Application No. 201980097252.1 dated Jul. 20, 2023, with English machine translation.

* cited by examiner

LIQUID CARBON DIOXIDE SUPPLY DEVICE AND SUPERCRITICAL FLUID APPARATUS

TECHNICAL FIELD

The present invention relates to a liquid carbon dioxide sending supply device and a supercritical fluid apparatus.

BACKGROUND ART

In a supercritical fluid apparatus such as a supercritical fluid chromatograph (SFC) or a supercritical fluid extraction device (SFE), a sample is analyzed or sorted with a supercritical fluid used as a mobile phase. For example, in an SFC described in Patent Document 1, liquid carbon dioxide is supplied as a mobile phase to a mobile phase flow path by a liquid sending pump. Further, a sample is injected into the mobile phase flow path by a sample injector.

The mobile phase and the sample pass through a separation column arranged in the mobile phase flow path. Here, the pressure in the mobile phase flow path is kept by a back-pressure valve and the temperature of the separation column is kept by a column oven such that the mobile phase is in a supercritical state at least in the separation column. The sample is separated into sample components by passing through the separation column and detected by a detector.

[Patent Document 1] JP 2016-173343 A

SUMMARY OF INVENTION

Technical Problem

In the supercritical fluid extraction device, a flow path for carbon dioxide is cooled to keep carbon dioxide a liquid phase. In a case where the volume of liquid carbon dioxide is large, a chiller is generally used to cool the flow path. However, the chiller is relatively large and is often installed on the floor. Therefore, an installation space for the chiller is large, so that the size of the supercritical fluid apparatus is increased. Further, because a pipe is cooled indirectly with use of a coolant such as water, the temperature of liquid carbon dioxide cannot be controlled stably. In this case, the flow rate of liquid carbon dioxide becomes unstable since density of liquid carbon dioxide becomes unstable.

An object of the present invention is to provide a liquid carbon dioxide sending supply device and a supercritical fluid apparatus that can supply liquid carbon dioxide at a stable flow rate while an increase in size of the liquid carbon dioxide sending supply device and the supercritical fluid apparatus is suppressed.

Solution to Problem

An aspect according to the present invention relates to a liquid carbon dioxide supply device that supplies liquid carbon dioxide to a supercritical fluid apparatus including a separation column and includes first and second flow paths, a compressor that circulates a refrigerant through the first flow path such that a refrigerant cycle is repeated, a heat exchanger that exchanges heat between the first flow path and the second flow path, and a pump that supplies liquid carbon dioxide flowing through the second flow path to the separation column.

Advantageous Effects of Invention

The present invention enables supply of liquid carbon dioxide at a stable flow rate while an increase in size of a liquid carbon dioxide sending supply device and a supercritical fluid apparatus is suppressed.

DESCRIPTION OF EMBODIMENTS

(1) Configuration of Supercritical Fluid Apparatus

Figure 1:
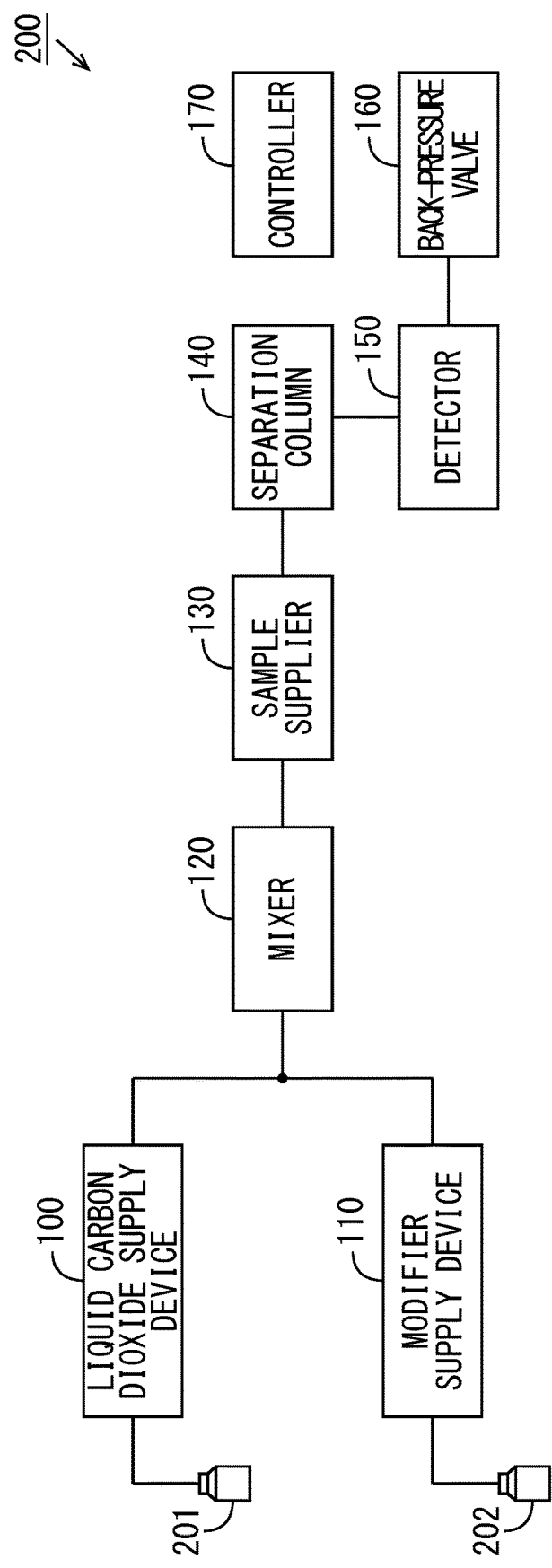
FIG. 1 is a diagram showing the configuration of a supercritical fluid apparatus according to one embodiment of the present invention.

A liquid carbon dioxide sending supply device and a supercritical fluid apparatus according to embodiments of the present invention will be described below in detail with reference to the drawings. FIG. 1 is a diagram showing the configuration of the supercritical fluid apparatus according to one embodiment of the present invention. As shown in FIG. 1, the supercritical fluid apparatus 200 is a supercritical fluid chromatograph (SFC) and includes the liquid carbon dioxide supply device 100, a modifier supply device 110, a mixer 120, a sample supplier 130, a separation column 140, a detector 150, a back-pressure valve 160 and a controller 170.

Bottles 201, 202 are provided in the supercritical fluid apparatus 200. Liquid carbon dioxide that is cooled to about 5° C., for example, is stored as a mobile phase in the bottle 201. The liquid carbon dioxide supply device 100 pumps the liquid carbon dioxide stored in the bottle 201 while cooling the liquid carbon dioxide. Details of the liquid carbon dioxide supply device 100 will be described below.

A modifier such as an organic solvent is stored as a mobile phase in the bottle 202. The modifier supply device 110 is a liquid sending pump, for example, and pumps the modifier stored in the bottle 202. The mixer 120 is a gradient mixer, for example, and supplies the mobile phases that have been respectively pumped by the liquid carbon dioxide supply device 100 and the modifier supply device 110 while mixing the mobile phases at a predetermined ratio.

The sample supplier 130 is an injector, for example, and introduces a sample to be analyzed into the separation column 140 together with a mobile phase supplied by the mixer 120. The separation column 140 is contained in a column oven (not shown) and heated to a predetermined temperature (about 40° C. in the present example) such that liquid carbon dioxide in the introduced mobile phase is put in a supercritical state. The separation column 140 separates the introduced sample into components according to differences in chemical property or composition.

The detector 150 is an absorbance detector, for example, and detects components into which the sample has been separated by the separation column 140. A result of detection by the detector 150 is used to generate a supercritical fluid chromatogram representing the relationship between a retention time of each component and a detection intensity, for example. The back-pressure valve 160 keeps the pressure applied to the mobile phase in the flow path at a value equal to or larger than a critical pressure of liquid carbon dioxide (8 MPa, for example) such that the liquid carbon dioxide in the mobile phase is put in a supercritical state at least in the separation column 140.

The controller 170 includes a CPU (Central Processing Unit) and a memory, or a microcomputer or the like and controls the operation of each of the liquid carbon dioxide supply device 100, the modifier supply device 110, the mixer 120, the sample supplier 130, the separation column 140 (the column oven), the detector 150 and the back-pressure valve 160. Further, in a case where a sorting device such as a fraction collector is provided at a position farther downward than the back-pressure valve 160, the controller 170 further controls the operation of the sorting device based on a result of detection by the detector 150. The controller 170 may be provided in the back-pressure valve 160.

(2) Configuration of Liquid Carbon Dioxide Supply Device

Figure 2:
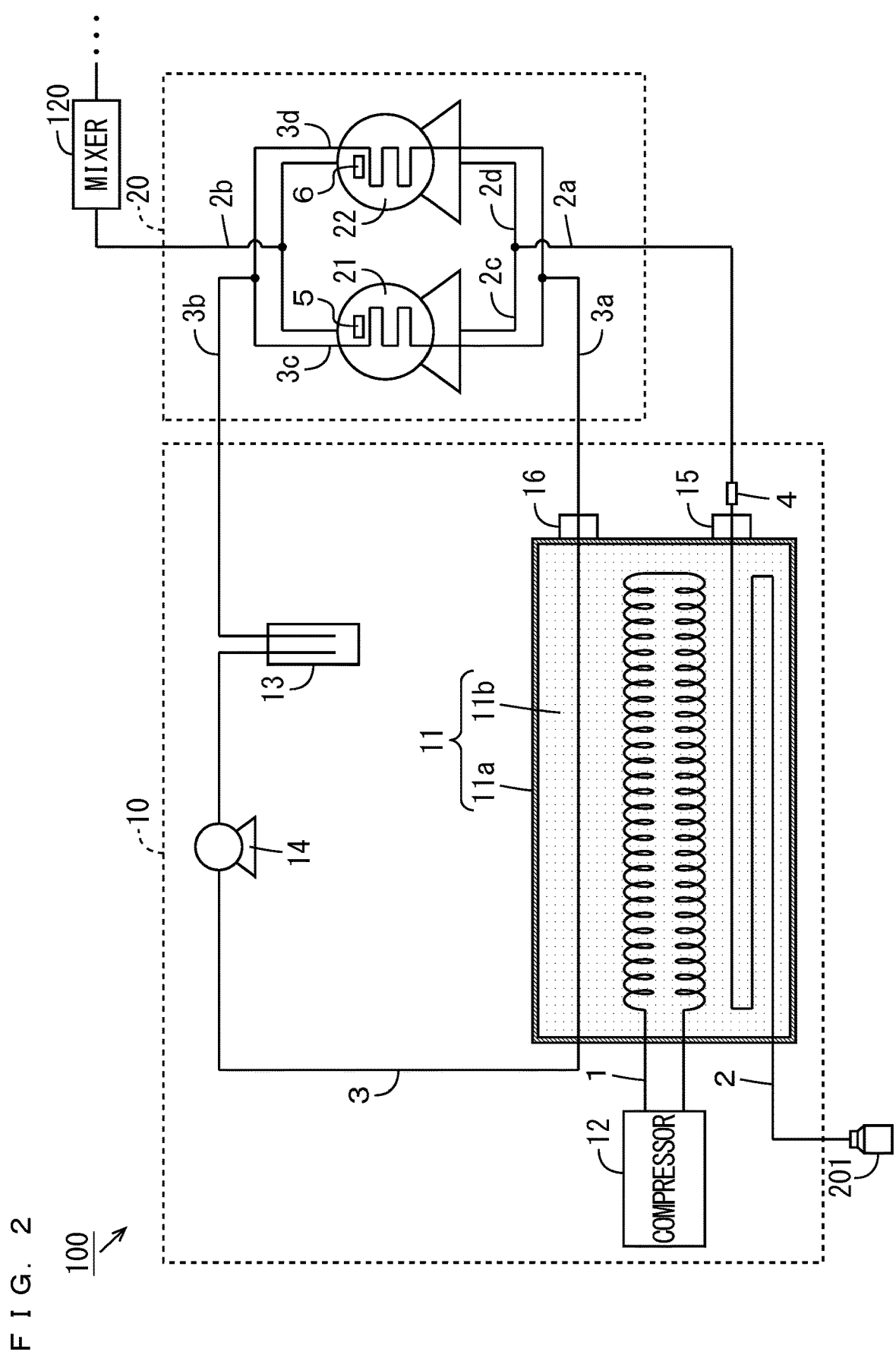
FIG. 2 is a diagram showing the configuration of a liquid carbon dioxide supply device of FIG. 1.

FIG. 2 is a diagram showing the configuration of the liquid carbon dioxide supply device 100 of FIG. 1. As shown in FIG. 2, the liquid carbon dioxide supply device 100 includes a cooler 10 and a pump 20. Further, flow paths 1, 2, 3 are provided in the liquid carbon dioxide supply device 100. Each of the flow paths 1 to 3 is a pipe, for example. The flow paths 1 to 3 are examples of first to third flow paths, respectively. In the following description, in the flow paths 2, 3, the direction in which liquid carbon dioxide or a coolant flows is defined as downstream, and its opposite direction is defined as upstream.

The cooler 10 includes a heat exchanger 11, a compressor 12, a storage 13 and a liquid sender 14. The heat exchanger 11 includes a block 11a and a metallic material 11b. The block 11a is constituted by four side surfaces, an upper surface and a bottom surface formed of sheets of metal and has a cuboid shape. Parts of the respective flow paths 1, 2, 3 are contained in the block 11a. The metallic material 11b includes tin, for example, and the block 11a is filled with the melted metallic material 11b. Thus, the gaps among the flow paths 1, 2, 3 are filled with the metallic material 11b in the block 11a.

The both ends of the flow path 1 are drawn out from the block 11a and connected to the compressor 12. The compressor 12 circulates a refrigerant such as fluorocarbon 407C (R-407C) through the flow path 1 such that a refrigerant cycle is repeated. Thus, the inside of the block 11a is cooled. In the present example, the flow path 1 is provided while being wound in a coil shape in the block 11a. Therefore, even in a case where the sufficiently long flow path 1 is used, the block 11a is kept compact. Thus, it is possible to sufficiently cool the inside of the block 11a by using the sufficiently long flow path 1.

The flow path 2 connects the bottle 201 and the mixer 120 to each other. The heat exchanger 11 and the pump 20 are provided in this order from an upstream portion toward a downstream portion in the flow path 2. In the block 11a, heat is exchanged between the flow path 1 and the flow path 2 through the metallic material 11b. Thus, the liquid carbon dioxide supplied from the bottle 201 to the mixer 120 is cooled. In the present example, the flow path 2 is provided in the block 11a in a meander-shape. Therefore, the length of the portion of the flow path 2 provided in the block 11a can be increased. Therefore, the liquid carbon dioxide can be cooled sufficiently.

The storage 13 is a bottle, for example, and stores a coolant such as ethylene glycol having a concentration of 60%. The liquid sender 14 is a diaphragm pump, for example, and pumps the coolant stored in the storage 13 to the pump 20 through the flow path 3. The heat exchanger 11 is provided in the portion of the flow path 3 between the liquid sender 14 and the pump 20. In the block 11a, heat is exchanged between the flow path 1 and the flow path 3 through the metallic material 11b. Thus, the coolant supplied from the liquid sender 14 to the pump 20 is cooled. The coolant supplied to the pump 20 is returned to the storage 13 through the flow path 3.

In the present example, the pump 20 is a parallel plunger pump and includes two pump heads 21, 22. In the pump 20, the flow path 2 includes main flow paths 2a, 2b and branch flow paths 2c, 2d. The main flow paths 2a, 2b are respectively connected to the cooler 10 and the mixer 120. The branch flow paths 2c, 2d are arranged in parallel with each other as two flow paths into which each of the main flow paths 2a, 2b is branched. The pump heads 21, 22 are respectively provided in the branch flow paths 2c, 2d and alternately pumps the liquid carbon dioxide stored in the bottle 201 to the mixer 120 through the cooler 10.

Further, in the pump 20, the flow path 3 includes main flow paths 3a, 3b and branch flow paths 3c, 3d. The main flow paths 3a, 3b are respectively connected to the heat exchanger 11 and the storage 13 of the cooler 10. The branch flow paths 3c, 3d are arranged to be in parallel with each other as two flow paths into which each of the main flow paths 3a, 3b is branched, and are respectively attached to the surfaces of the pump heads 21, 22. A coolant supplied from the heat exchanger 11 through the main flow path 3a flows through the branch flow paths 3c, 3d. Thus, the pump heads 21, 22 are cooled. The coolant that has flown through the branch flow paths 3c, 3d is returned to the storage 13 through the main flow path 3b.

(3) Operation of Controller

With the above-mentioned cooling mechanism, in the heat exchanger 11, the flow path 1 is cooled to about −30° C., for example, and each of the flow paths 2, 3, is cooled to about −10° C. On the other hand, the temperature of the liquid carbon dioxide flowing through the flow path 2 is preferably another value (about 5° C. in the present example). Further, the temperatures of the pump heads 21, 22 are preferably another value (about 5° C. in the present example).

As such, heaters 15, 16 are respectively attached to downstream portions of the flow paths 2, 3 drawn out from the block 11a. The heaters 15, 16 are examples of first and second heaters, respectively. Further, at a position farther downward than the heater 15, a temperature sensor 4 is attached to the surface of the flow path 2. Further, temperature sensors 5, 6 are respectively attached to the surfaces of the pump heads 21, 22. Each of the temperature sensors 4 to 6 includes a thermistor, for example. The temperature sensor 4 is an example of a first temperature sensor, and the temperature sensors 5, 6 are examples of a second temperature sensor. The operations of the heaters 15, 16 are controlled independently from the controller 170 of FIG. 1.

Specifically, the operation of the heater 15 is controlled such that a temperature detected by the temperature sensor 4 is a desired temperature. Here, because the temperature sensor 4 is directly attached to the surface of the flow path 2, the temperature of liquid carbon dioxide flowing through the flow path 2 is detected accurately as a temperature of the flow path 2. Therefore, with the above-mentioned control, the temperature of liquid carbon dioxide flowing through the flow path 2 can be kept at a desired temperature. The temperature sensor 4 may be fixed to the flow path 2 by a conductive tape or a conductive adhesive having a high heat transfer property. In this case, the temperature of the flow path 2 can be detected with higher accuracy.

Similarly, the operation of the heater 16 is controlled such that the temperatures detected by the temperature sensors 5, 6 are desired temperatures. Thus, the temperatures of the pump heads 21, 22 can be maintained at desired temperatures. The temperature sensors 5, 6 may be directly attached to the surfaces of the branch flow paths 3c, 3d, and the temperatures of the pump heads 21, 22 may be respectively detected as temperatures of the branch flow paths 3c, 3d.

(4) Effects

In the supercritical fluid apparatus 200 according to the present embodiment, because a chiller is not required in order to cool the flow path 2, an increase in size of the liquid carbon dioxide supply device 100 is suppressed. In this case, the liquid carbon dioxide supply device 100 does not have to be installed on the floor and can be placed on a table. Therefore, a large space can be ensured in the supercritical fluid apparatus 200, and this can save space.

Further, the flow path 2 can be directly cooled without use of a coolant such as water. Therefore, the temperature of liquid carbon dioxide is stabilized, so that density of the liquid carbon dioxide is stabilized. As a result, it is possible to supply liquid carbon dioxide at a stable flow rate while suppressing an increase in size of the liquid carbon dioxide supply device 100 and the supercritical fluid apparatus 200.

Further, the flow path 2 is heated by the heater 15 based on a temperature detected by the temperature sensor 4. Here, because the temperature sensor 4 is directly attached to the surface of the flow path 2, the temperature of the flow path 2 can be detected with high accuracy as a temperature of liquid carbon dioxide flowing through the flow path 2. Therefore, the temperature of liquid carbon dioxide can be adjusted easily to a desired temperature. Thus, liquid carbon dioxide can be supplied at a more stable flow rate.

Further, in a case where the flow rate of liquid carbon dioxide is small, the temperature of liquid carbon dioxide is likely to change due to an effect of outside air in a portion of the flow path 2 from the heat exchanger 11 to the pump 20. Even in this case, heat is exchanged by the heat exchanger 11 between the flow path 1 and the flow path 3. Further, the temperature of the flow path 3 is adjusted by the heater 16 to a desired temperature based on temperatures of the pump heads 21, 22 respectively detected by the temperature sensors 5, 6. Thus, the pump heads 21, 22 are cooled to desired temperatures through a coolant flowing through the flow path 3. As a result, the temperature of liquid carbon dioxide supplied by the pump 20 can be stabilized more sufficiently.

(5) Other Embodiments (a) While the cooler 10 is configured to be capable of cooling the pump heads 21, 22 of the pump 20 in the above-mentioned embodiment, the embodiment is not limited to this. In a case where the temperatures of the pump heads 21, 22 are sufficiently stable or a case where the temperatures of the pump heads 21, 22 are adjusted by another temperature adjustment device, the cooler 10 does not have to be configured to be capable of cooling the pump heads 21, 22 of the pump 20.

(b) While the heater 15 is attached to a downstream portion of the flow path 2 drawn out from the block 11a in the above-mentioned embodiment, the embodiment is not limited to this. The heater 15 may be attached to an upstream portion of the flow path 2 drawn out from the block 11a. Even in this case, the temperature sensor 4 is attached to the flow path 2 at a position farther downstream than the heat exchanger 11 and the heater 15.

While the heater 16 is similarly attached to a downstream portion of the flow path 3 drawn out from the block 11a, the embodiment is not limited to this. The heater 16 may be attached to an upstream portion of the flow path 3 drawn out from the block 11a.

Further, in a case where liquid carbon dioxide flowing through the flow path 2 is cooled by the heat exchanger 11 to a desired temperature, the heater 15 does not have to be attached to the flow path 2. In a case where the pump heads 21, 22 are cooled to a desired temperature by the heat exchanger 11, the heater 16 does not have to be attached to the flow path 3.

(c) While the supercritical fluid apparatus 200 is configured as an SFC in the above-mentioned embodiment, the embodiment is not limited to this. The supercritical fluid apparatus 200 may be configured as a supercritical fluid extraction device (SFE). Alternatively, the supercritical fluid apparatus 200 may be configured as an SFC-MS in which a mass spectrometer (MS) is provided instead of the detector 150.

Aspects (Item 1) A liquid carbon dioxide supply device according to one aspect that supplies liquid carbon dioxide to a supercritical fluid apparatus including a separation column, may include first and second flow paths, a compressor that circulates a refrigerant through the first flow path such that a refrigerant cycle is repeated, a heat exchanger that exchanges heat between the first flow path and the second flow path, and a pump that supplies liquid carbon dioxide flowing through the second flow path to the separation column.

In this liquid carbon dioxide supply device, the refrigerant is circulated through the first flow path by the compressor such that the refrigerant cycle is repeated. In this case, in the heat exchanger, heat is exchanged between the first flow path and the second flow path, and the second flow path is cooled. Therefore, the liquid carbon dioxide flowing through the second flow path is cooled. The liquid carbon dioxide cooled in the second flow path is supplied to the separation column of the supercritical fluid apparatus by the pump.

With this configuration, because it is not necessary to use a chiller to cool the second flow path, an increase in size of the liquid carbon dioxide supply device is suppressed. Further, it is possible to cool the second flow path directly without using a coolant such as water. Therefore, the temperature of liquid carbon dioxide is stabilized, so that density of the liquid carbon dioxide is stabilized. As a result, it is possible to supply liquid carbon dioxide at a stable flow rate while suppressing an increase in size of the liquid carbon dioxide supply device.

(Item 2) The liquid carbon dioxide supply device according to item 1, wherein the heat exchanger may include a block having an inner space that contains part of the first flow path and part of the second flow path, and a metallic material that fills the inner space of the block to fill in a gap between the first flow path and the second flow path.

In this case, heat can be exchanged efficiently between the first flow path and the second flow path through the metallic material.

(Item 3) The liquid carbon dioxide supply device according to item 1 or 2, may further include a first heater that heats the second flow path.

In this case, it is possible to easily keep the temperature in the second flow path at a desired temperature by heating the second flow path. Thus, the temperature of the liquid carbon dioxide flowing through the second flow path can be kept at a desired temperature.

(Item 4) The liquid carbon dioxide supply device according to item 3, may further include a first temperature sensor that is attached to the second flow path at a position farther downstream than the heat exchanger and the first heater and detects a temperature in the second flow path.

In this case, because the first temperature sensor is attached to the second flow path, the temperature of the second flow path can be detected with high accuracy as a temperature of the liquid carbon dioxide flowing through the second flow path. Therefore, the temperature of the liquid carbon dioxide flowing through the second flow path can be easily adjusted by the first heater based on a detected temperature. Thus, the liquid carbon dioxide can be supplied at a more stable flow rate.

(Item 5) The liquid carbon dioxide supply device according to item 1 or 2, may further include a third flow path in which a coolant circulates, wherein the heat exchanger may further exchange heat between the first flow path and the third flow path, and the pump may include a pump head to which part of the third flow path is attached.

In a case where the flow rate of liquid carbon dioxide is small, the temperature of liquid carbon dioxide is likely to change due to an effect of outside air in the portion of the second flow path from the heat exchanger to the pump. Even in this case, with the above-mentioned configuration, the pump head is cooled by the third flow path. Thus, the temperature of liquid carbon dioxide supplied by the pump can be stabilized more sufficiently.

(Item 6) The liquid carbon dioxide supply device according to item 5, may further include a second heater that heats the third flow path.

In this case, it is possible to easily keep the temperature of the third flow path at a desired temperature by heating the third flow path. Thus, the temperature of the pump head can be kept at a desired temperature through the coolant flowing through the third flow path. As a result, the temperature of liquid carbon dioxide supplied by the pump can be kept at a desired temperature.

(Item 7) The liquid carbon dioxide supply device according to item 6 may further include a second temperature sensor that detects a temperature of the pump head.

In this case, the temperature of the third flow path can be easily adjusted by the second heater based on a temperature detected by the second temperature sensor.

(Item 8) A supercritical fluid apparatus according to another aspect may include a separation column, the liquid carbon dioxide supply device according to item 4 that supplies liquid carbon dioxide to the separation column, and a controller that controls an operation of the first heater such that a temperature detected by the first temperature sensor of the liquid carbon dioxide device is a preset temperature.

In this supercritical fluid apparatus, the operation of the first heater is controlled by the controller such that the temperature detected by the first temperature sensor of the above-mentioned liquid carbon dioxide supply device is a preset temperature. Thus, the temperature of liquid carbon dioxide flowing through the second flow path is kept at a desired temperature. With this configuration, it is possible to supply liquid carbon dioxide to the separation column at a stable flow rate while suppressing an increase in size of the liquid carbon dioxide supply device.

The invention claimed is:

1. A liquid carbon dioxide supply device capable of supplying liquid carbon dioxide to a supercritical fluid apparatus, comprising:
    a first flow path through which a refrigerant flows;
    a pump;
    a second flow path which is provided at a position farther upstream than the pump and through which liquid carbon dioxide flows;
    a compressor that circulates the refrigerant through the first flow path such that a refrigerant cycle is repeated; and
    a heat exchanger that is provided at a position farther upstream than the pump, exchanges heat between the first flow path and the second flow path and cools liquid carbon dioxide flowing through the second flow path by the refrigerant flowing through the first flow path,
    wherein the pump is configured to be capable of supplying liquid carbon dioxide flowing through the second flow path to the supercritical fluid apparatus.

2. The liquid carbon dioxide supply device according to claim 1, wherein
    the heat exchanger includes
    a block having an inner space that contains part of the first flow path and part of the second flow path, and
    a metallic material that fills the inner space of the block to fill in a gap between the first flow path and the second flow path.

3. The liquid carbon dioxide supply device according to claim 1, further comprising a first heater that heats the second flow path.

4. The liquid carbon dioxide supply device according to claim 3, further comprising a first temperature sensor that is attached to the second flow path at a position farther downstream than the heat exchanger and the first heater and detects a temperature in the second flow path.

5. A supercritical fluid apparatus comprising:
    a separation column;
    the liquid carbon dioxide supply device according to claim 4 that supplies liquid carbon dioxide to the separation column; and
    a controller that controls an operation of the first heater such that a temperature detected by the first temperature sensor of the liquid carbon dioxide device is a preset temperature.

6. The liquid carbon dioxide supply device according to claim 1, wherein the refrigerant is fluorocarbon.

7. A liquid carbon dioxide supply device capable of supplying liquid carbon dioxide to a supercritical fluid apparatus, comprising:
    a first flow path through which a refrigerant flows;
    a pump;
    a second flow path which is provided at a position farther upstream than the pump and through which liquid carbon dioxide flows;
    a compressor that circulates the refrigerant through the first flow path such that a refrigerant cycle is repeated;
    a heat exchanger that is provided at a position farther upstream than the pump, exchanges heat between the first flow path and the second flow path and cools liquid carbon dioxide flowing through the second flow path by the refrigerant flowing through the first flow path; and
    a third flow path in which a coolant circulates, wherein
    the heat exchanger further exchanges heat between the first flow path and the third flow path, and
    the pump is configured to be capable of supplying liquid carbon dioxide flowing through the second flow path to the supercritical fluid apparatus and includes a pump head to which part of the third flow path is attached.

8. The liquid carbon dioxide supply device according to claim 7, further comprising a second heater that heats the third flow path.

9. The liquid carbon dioxide supply device according to claim 8, further comprising a second temperature sensor that detects a temperature of the pump head.

\* \* \* \* \*